United States Patent [19]

Vater et al.

[11] Patent Number: 4,648,495
[45] Date of Patent: Mar. 10, 1987

[54] CLUTCH ASSEMBLY AND LUBRICATION ARRANGEMENT

[75] Inventors: George R. Vater, Clarendon Hills; Joachim Horsch, Lombard, both of Ill.

[73] Assignee: J. I. Case Company, Racine, Wis.

[21] Appl. No.: 770,315

[22] Filed: Aug. 28, 1985

[51] Int. Cl.⁴ .................... F16D 25/064; F16D 13/74
[52] U.S. Cl. ........................... 192/70.12; 192/85 AA; 192/113 B
[58] Field of Search ........... 192/70.12, 113 B, 85 AA, 192/107 M

[56] References Cited

U.S. PATENT DOCUMENTS

| | | | |
|---|---|---|---|
| 2,556,809 | 6/1951 | Hobbs | 192/113 B X |
| 2,690,248 | 7/1954 | McDowall | 188/264 E X |
| 2,733,798 | 2/1956 | Almen et al. | 192/113 B |
| 2,766,864 | 10/1956 | Schilling et al. | 192/85 AA |
| 3,823,801 | 7/1974 | Arnold | 192/113 B X |
| 4,003,452 | 1/1977 | Kupfert et al. | 188/264 E X |
| 4,027,758 | 6/1977 | Gustavsson et al. | 192/113 B |

FOREIGN PATENT DOCUMENTS 998578  7/1965  United Kingdom ......... 192/85 AA

Primary Examiner—Rodney H. Bonck
Assistant Examiner—David A. Testardi
Attorney, Agent, or Firm—Dressler, Goldsmith, Shore, Sutker & Milnamow, Ltd.

[57] ABSTRACT

A hydraulically-operated clutch assembly is disclosed having an improved lubrication arrangement therefor. The assembly includes a shaft-mounted drum-like clutch carrier, and an adjacent transmission gear. The assembly further includes a plurality of clutch friction plates mounted on and operatively connected to the gear, and a plurality of clutch separator plates arranged in an alternating array with the friction plates, with the separator plates coupled for rotation with the clutch carrier. The lubrication arrangement includes means for supplying pressurized lubricant to the interface between the clutch friction plates and the associated gear, and means for inhibiting lubricant flow out of the assembly whereby the service life thereof is significantly enhanced.

2 Claims, 2 Drawing Figures

CLUTCH ASSEMBLY AND LUBRICATION ARRANGEMENT

TECHNICAL FIELD

The present invention relates generally to power transmissions having selectively operable clutch assemblies, and more particularly to a hydraulically-operated clutch assembly and an improved arrangement for effecting lubrication thereof.

BACKGROUND OF THE INVENTION

Multi-speed transmissions are typically provided in material handling implements and agricultural equipment to facilitate efficient performance of various work operations. While a number of different types of multi-speed transmissions are known, one arrangement which has found particular suitability in this type of equipment includes a plurality of hydraulically-operated clutches. Selective fluid pressurization of any one of the clutches effects selection of an associated one of a plurality of speed ratios. In such arrangements, the gears of the associated gear set are typically in constant mesh, with selective pressurization of the associated clutch functioning to couple one of the gears in power-transmitting relation with the clutch, thus transmitting power through the gear set.

In a typical construction including a hydraulically-operated clutch and an associated gear set, the clutch is mounted on a transmission shaft for rotation therewith, with the gear to be selectively coupled with the clutch positioned on the shaft in generally adjacent relation to the clutch. A plurality of annular clutch friction plates are provided generally within the clutch assembly, with the friction plates typically coupled to the associated gear by splines or the like for rotation therewith. Clutch separator plates are further provided between adjacent ones of the friction plates, with the annular separator plates including means whereby they are coupled for rotation with the clutch housing and transmission shaft. A hydraulically pressurized clutch piston is provided for urging the separator plates and friction plates into frictional engagement with each other, whereby the gear is coupled in power-transmitting relation with the clutch and shaft.

A hydraulically-operated clutch of this nature is frequently configured as a "wet" clutch, i.e., one in which lubricant is generally continuously supplied to the clutch assembly. In a typical construction, lubricant passages are provided in the gear and the transmission shaft such that pressurized lubricant is introduced into the assembly generally at the splined interface of the gear and the clutch friction plates. The lubricant typically flows axially out of the assembly between the clutch and the gear, and also flows radially out of the assembly between the clutch friction plates and separator plates. Lubricant flow radially out of the clutch can occur by flow through grooves defined by the friction surfaces of the friction plates, in that such grooves provide flow paths between the inner peripheries of the plates and their outer peripheries. Grooves of this nature are ordinarily provided in the friction material so that upon clutch engagement, lubricant is quickly "sheared" or "wiped" from the friction surfaces of the clutch plates for quickly establishing positive engagement.

While the above-described hydraulic clutch arrangement has been in widespread use, problems of premature wear have been experienced in some applications. In particular, premature wear of the spline teeth of the clutch friction plates at their splined connection to the associated gear has been experienced. This unusual wear is believed to have resulted from the friction plates being subjected to oscillation during operation of the transmission, with the oscillation creating sufficient friction to form minute welds between the spline teeth of the friction plate and the splines of the gear. Fracture of these minute welds results in particles of material being present at the spline interface, with such material acting as an abrasive such that grooves are worn into the gear spline teeth, and the spline teeth of the friction plate are worn to a pointed condition. In extreme cases, this "fretting" wear has resulted in breaking of the friction plate spline teeth.

In the past, various attempts have been made to correct the premature wear of the splined interface between the clutch friction plates and the associated gear. Attempts to solve the problem have included subjecting the spline teeth of the friction plates to additional hardening treatment, reconfiguring the spline teeth to be of a relatively greater thickness, reconfiguring the splined connection to one of a coarser pitch, and improving the support of the gear mounted on the transmission shaft in an effort to minimize eccentric motion thereof that contributes to the above wear problem. However, these various solutions were found to only provide a small increase in the useful service life of the construction.

Upon further investigation and testing of this wear phenomenon, it was determined that an improved arrangement for effecting lubrication of the clutch assembly significantly abates the above-described wear problem, thus significantly contributing to the useful service life of the transmission.

SUMMARY OF THE INVENTION

The present invention concerns a power-transmitting clutch assembly generally as described above having an improved arrangement for effecting lubrication of the assembly. In particular, the present lubrication arrangement is configured such that pressurized lubricant is supplied to the interior of the clutch assembly, with means provided for inhibiting flow of lubricant both axially and radially out of the assembly. This arrangement has been found to very significantly enhance the service life of the assembly, and in particular to obviate problems of excessive clutch friction plate spline tooth wear.

The present clutch assembly and lubrication arrangement therefor is disclosed in a construction comprising a power-transmitting transmission shaft, with the clutch assembly including a drum-like clutch carrier mounted on the shaft by means of a splined connection for rotation therewith. The arrangement further includes a gear or like member to be coupled in power-transmitting relation with the shaft via the clutch. To this end, the gear is rotatably mounted on the transmission shaft in generally adjacent axial relation to the clutch carrier.

The assembly includes a plurality of generally annular, first clutch friction plates mounted on the gear. The friction plates each include spline teeth which mesh with like spline teeth defined by the shaft-mounted gear, whereby the friction plates and the gear are coupled to each other for rotation together, with the splined interconnection permitting limited relative axial movement of the friction plates with respect to the gear.

The clutch friction plates are positioned generally within the clutch carrier of the assembly. Selective coupling of the gear with the clutch carrier (and thus with the transmission shaft with which the carrier rotates) is effected by means of a plurality of generally annular, second clutch separator plates respectively disposed between adjacent ones of the friction plates. Thus, the friction plates and the separator plates are arranged in an alternating array, with the separator plates likewise being disposed within the clutch carrier, and including tab-like projections for coupling the separator plates to the clutch carrier for rotation As will be recognized by those familiar with the art, coupling of the shaft-mounted gear and the clutch carrier is effected by urging the clutch friction plates and separator plates axially into frictional engagement with each other. In the illustrated embodiment wherein a hydraulically-operated clutch is disclosed, a generally annular clutch piston is provided within the clutch carrier, with the piston urging the friction plates and separator plates into frictional engagement with each other responsively to hydraulic fluid pressurization of the clutch piston. In the illustrated embodiment, a plurality of clutch return springs are provided which are arranged in opposition to the clutch piston, and thus effect return movement of the piston attendant to relief of fluid pressure thereon.

The lubrication arrangement of the present construction includes means for supplying lubricant into the clutch carrier generally at the splined coupling between the clutch friction plates and the associated gear. To this end, the transmission shaft defines a lubricant conduit, with the shaft-mounted gear defining a plurality of generally radially extending lubricant passages which communicate with the lubricant conduit in the shaft, and which direct pressurized lubricant into the clutch carrier generally at the splined connection of the friction plates with the gear.

As noted, past constructions in which lubricant has been supplied to the splined connection between clutch friction plates and an associated gear have usually been arranged such that lubricant flows axially out of the assembly, as well as radially out of the assembly between the clutch separator and friction plates. In significant distinction, the present invention has been specifically configured to inhibit flow of lubricant out of the clutch carrier to thereby enhance the service life of the clutch. More particularly, the present construction acts to maintain a positive lubricant pressure at the splined connection between the clutch friction plates and the associated gear. During development of the present invention, it was determined that by inhibiting the flow of lubricant axially out of the clutch carrier, significant enhancement of the service life could be obtained. Thus, the present construction includes an annular seal arranged concentrically about the transmission shaft, with the annular seal extending between and sealingly engaging the shaft-mounted gear and the clutch carrier of the adjacent clutch assembly. This seal acts to substantially prevent flow of lubricant axially out of the clutch carrier between the gear and the carrier.

It was further determined that while the above-described annular seal very significantly reduces premature wear of the clutch, further enhancement of the service life could be achieved by restricting the flow of lubricant radially out of the clutch carrier. To this end, the friction surfaces of the clutch friction plates have been specifically configured to inhibit flow of lubricant radially of the clutch carrier. In distinction from previous friction plate arrangements, the friction plates of the present assembly have friction surfaces defining a plurality of grooves, wherein the grooves extend such that fluid communication between the interior of the plates and the exterior of the plates, via the grooves, is substantially eliminated. As a consequence, flow of lubricant radially of the clutch carrier is restricted when the clutch is engaged, with this arrangement cooperating with the annular seal which inhibits axial lubricant flow to maintain a substantially continuous, positive lubricant fluid pressure at the splined interconnection between the clutch friction plates and the associated gear. As noted, significant enhancement of the service life of the spline teeth very desirably results from the arrangement of the present invention.

Numerous other features and advantages of the present invention will become readily apparent from the following detailed description, the accompanying drawings, and the appended claims.

DETAILED DESCRIPTION

Figure 1:
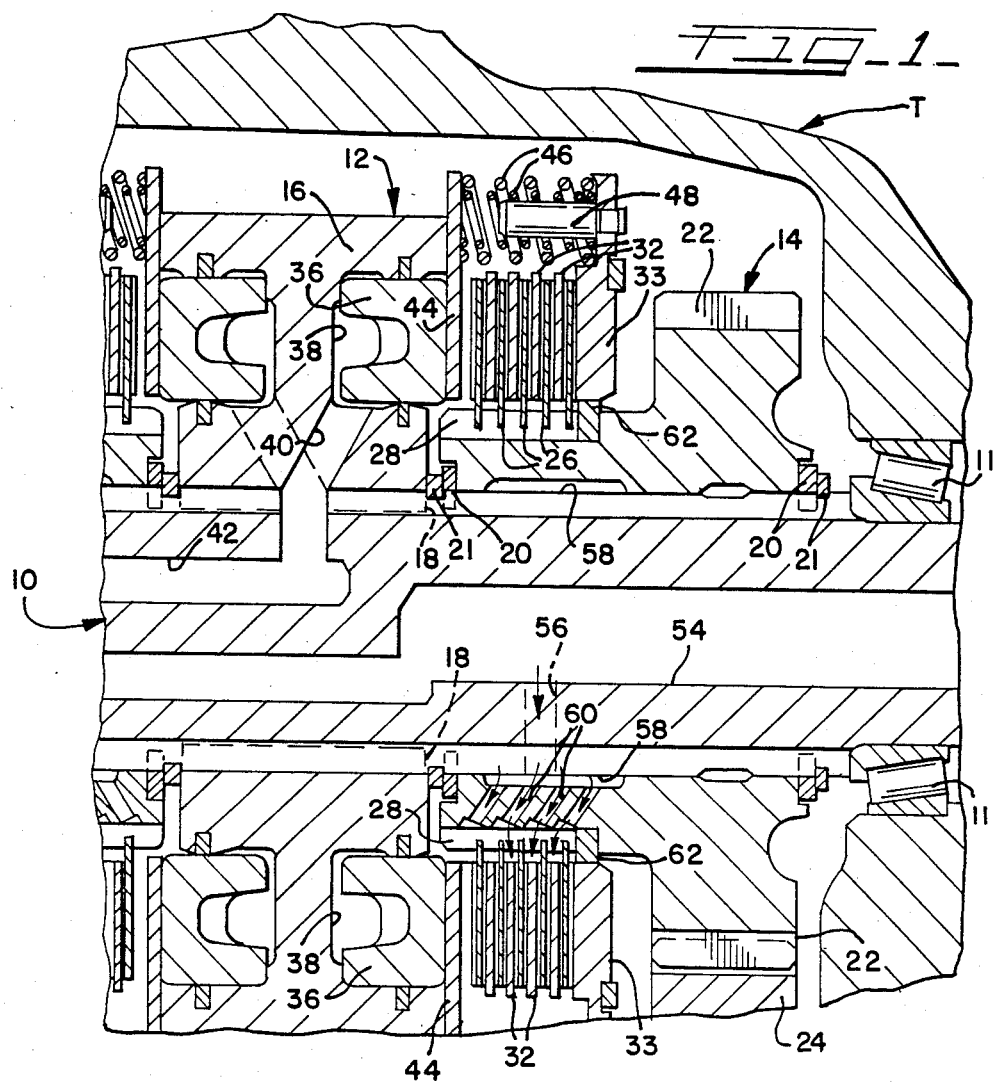
FIG. 1 is a diagrammatic view illustrating a portion of a transmission having a clutch assembly and lubrication arrangement therefor embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to the drawings, therein is illustrated a portion of a transmission T having a clutch assembly and lubrication arrangement embodying the principles of the present invention. As will be recognized by those familiar with the art, a typical multi-speed transmission such as for a material handling implement or the like ordinarily includes a plurality of transmission shafts, and a plurality of clutch mechanisms and respectively associated gear sets whereby selective operation of the clutches effects selection of the desired gear ratio for the transmission.

For purposes of disclosing the present invention, a single hydraulically-operated clutch and its associated gear set will be described, with the understanding that in a typical application, each one of a plurality of clutch assemblies can be configured in accordance with the principles disclosed herein. The arrangement shown in the drawings reflects a typical installation wherein two adjacent and similarly configured hydraulic clutch assemblies include some shared components; for purposes of the present disclosure, only a single one of the clutch assemblies will be described.

In the illustrated embodiment of the present invention, a transmission shaft 10 is shown supported by bearings such as 11 for rotation, with a clutch assembly embodying the present invention including a drum-like clutch carrier, generally designated 12, mounted on the shaft 10 in axially fixed relation with respect thereto. A transmission gear 14 is further provided, with the gear 14 rotatably mounted on the shaft 10 in generally axially adjacent relation to clutch carrier 12.

Clutch carrier 12 is arranged to rotate together with transmission shaft 10 in power-transmitting relation, and to this end, the clutch carrier includes a hub portion 16 fixed for rotation with shaft 12 by means of a splined connection generally at 18. In contrast, transmission gear 14 is configured for rotation or "free wheeling" with respect to shaft 10, and is held in axially fixed relation with respect to the shaft by thrust washers 20 and associated clips 21. Gear teeth 22 of gear 14 are arranged to mesh with an associated gear 24 carried by another shaft (not shown) in the transmission, with the number of teeth defined by gear 14 and by gear 24 being selected such that coupling of each of the gears with their respective shafts effects the desired speed ratio increase or decrease in the respective rotational speeds of the shafts.

As will be appreciated, the operative coupling of gear 14 with shaft 10 in power-transmitting relation is effected by means of the clutch assembly, and to this end, a plurality of generally annular, friction plates 26 are provided which are mounted on transmission gear 14, and which are positioned generally within clutch carrier 12. Transmission gear 14 includes a plurality of circumferentially spaced gear splines 28, with each of friction plates 26 (5 being illustrated) defining a plurality of like spline teeth 30 (see FIG. 2). Thus, friction plates 26 are operatively coupled to transmission gear 14 for rotation together, with the splined interconnection between the friction plates and the gear permitting limited relative movement of the friction plates with respect to gear splines 28.

The present clutch assembly further includes a plurality of separator plates 32 (4 being shown) which are positioned generally within clutch carrier 12, and which are respectively arranged between adjacent ones of the friction plates 26. Thus, the friction plates 26 and the separator plates 32 are disposed in an alternating array, and are positioned adjacent to an axially fixed backing plate 33 of the clutch carrier 12 against which the plates are urged attendant to clutch engagement. As will be recognized by those familiar with the art, separator plates 32 include suitable tab like projections at their outer peripheries which extend into slots defined by the drum-like clutch carrier 12.

In order to operatively couple transmission gear 14 with clutch carrier 12, thus coupling the gear with transmission shaft 10, means are provided for urging friction plates 26 and separator plates 32 into frictional engagement with each other. To this end, the clutch assembly includes an annular clutch piston 36 mounted for movement within an annular clutch fluid chamber 38 defined by clutch hub portion 16. Pressurized hydraulic fluid is selectively introduced into fluid chamber 38 by way of a fluid passage 40 defined by clutch carrier 12, with passage 40 communicating with a fluid passage 42 defined by transmission shaft 10. Selective fluid pressurization of clutch chamber 38 urges clutch piston 36 axially of the clutch carrier (to the right referring to the orientation of FIG. 1) such that the clutch piston urges an annular pressure plate 44 in opposition to clutch springs 46, thereby urging friction plates 26 and separator plates 32 against backing plate 33, and urging the plates into frictional engagement with each other. Clutch return springs 46 effect return movement of pressure plate 44 and clutch piston 36 upon relief of fluid pressure in chamber 38, with suitable spring guide pins 48 provided for maintaining the various components in alignment.

As noted above, the present clutch assembly is of the so-called "wet" type in that lubricant is normally continuously supplied to the clutch during its operation. In the illustrated embodiment of the present invention, a substantially continuous supply of pressurized lubricant is supplied to the clutch assembly, and more particularly, to the splined connection between friction plates 26 and transmission gear 14. To this end, transmission shaft 10 defines a pressurized lubricant conduit 54, and further defines at least one radially oriented lubricant passage 56 which communicates with the conduit 54. The lubrication arrangement further includes an annular lubricant chamber 58 which is defined by transmission gear 14 at its interface with transmission shaft 10.

Flow of lubricant from annular chamber 58 to the splined connection between gear 14 and friction plates 26 is effected by means of a plurality of generally radially extending lubricant passages 60 defined by transmission gear 14. These lubricant passages 60, which may be arranged in a group such as shown, are typically provided such that a plurality of groups of the passages (such as several groups of four passages each) are defined by the gear, with the groups of passages arranged in circumferentially spaced relation. Each group of the lubricant passages open into the splined interface of gear 14 and friction plates 26 ordinarily at a location whereat one of the gear splines 28 has been removed.

In order to retain an adequate supply of pressurized lubricant at the splined connection between plates 26 and gear 14, annular lubricant seal 62 is provided. Annular seal 62 may comprise suitable low-friction material such as polytetrafluoroethylene, and is arranged concentrically about transmission shaft 10 so that the seal extends between and sealingly engages transmission gear 14 and the backing plate 33 of the clutch carrier 12. By this arrangement, flow of lubricant in an axial direction out of the clutch carrier 12 between the carrier and the gear 14 is substantially prevented, thus contributing to the maintenance of positive lubricant pressure at the splined connection of friction plates 26 to gear 14.

As will be recognized, flow of lubricant out of clutch carrier 12 ordinarily occurs in a radial direction such as by flow between adjacent ones of separator plates 32 and friction plates 26. However, the preferred form of the present invention contemplates that flow of lubricant radially out of clutch carrier 12 also be inhibited and restricted. To this end, the oppositely facing friction surfaces of friction plates 26 have been specifically configured to minimize and restrict lubricant flow from gear splines 28 toward the outer peripheries of plates 26 and 32.

Figure 2:
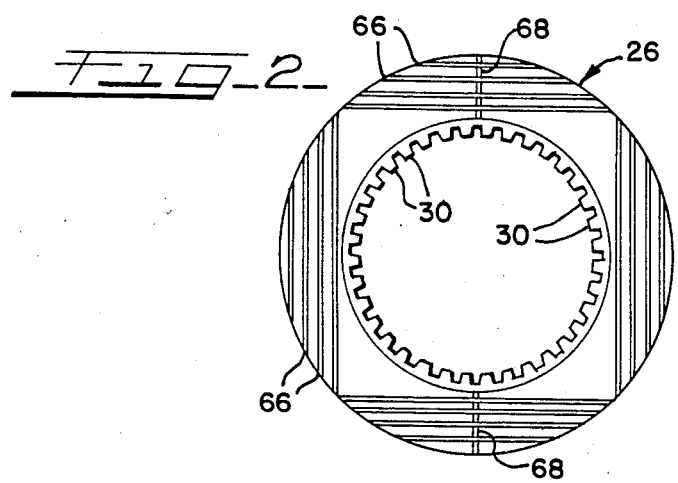
FIG. 2 is a plan view of a clutch friction plate of the clutch assembly shown in FIG. 1.

The preferred configuration for the friction surfaces of plates 26 is illustrated in FIG. 2. In distinction from previous constructions wherein grooves defined by a clutch friction plate provide fluid communication pathes between the internal and external diameters of the plate, it will be observed that the grooves 66 defined by the friction material of friction plates 26 are arranged in a non-radial configuration, and are arranged in non-intersecting, parallel groups, with each groove 66 arranged generally as a chord with respect to the annular plate. The configuration of grooves 66 is such that fluid communication between the interior and the exterior of the plate, by way of the grooves 66, is substantially eliminated; i.e., none of grooves 66 intersects the interior edge of the plate. While other groove configurations can be arranged to function similarly, the illustrated pattern is preferred since it is relatively economical to manufacture. If it is desired to permit some limited radial lubricant flow within the grooves defined by the friction surfaces of plates 26, small radially oriented grooves 68 may optionally be provided.

Thus, a clutch assembly and lubrication arrangement are disclosed which greatly reduce the wear to which the assembly is subjected, thus very desirably enhancing its useful service life.

From the foregoing, it will be observed that numerous modifications and variations can be effected without departing from the true spirit and scope of the novel concept of the present invention. It is to be understood that the present disclosure is to be considered as an exemplification of the invention, and is not intended to limit the invention to the specific embodiment illustrated. It is, of course, intended to cover by the apended claims, all such modifications as fall within the scope of the claims.

What is claimed is:

1. A power-transmitting clutch assembly and improved arrangement for effecting lubrication thereof, comprising:

a shaft;

a drum-like clutch carrier mounted on said shaft for rotation therewith;

gear means rotatably mounted on said shaft in generally adjacent axial relation to said clutch carrier;

a plurality of generally annular, first clutch friction plates mounted on said gear means, including spline means for coupling said friction plates and said gear means for rotation together, said friction plates being positioned generally within said clutch carrier;

a plurality of generally annular, second clutch separator plates respectively disposed between adjacent ones of said friction plates such that said friction plates and said separator plates are arranged in an alternating array, said separator plates being disposed within said clutch carrier and including means for coupling said separator plates to said clutch carrier for rotation therewith;

means for urging said friction plates and said separator plates axially into frictional engagement with each other so that said gear means is coupled in power-transmitting relation with said clutch carrier and is rotatable therewith, said means for urging comprising an annular clutch piston mounted in said clutch carrier for movement responsively to fluid pressurization of said piston, said clutch arrangement including clutch return spring means arranged in opposition to said clutch piston;

means for supplying lubricant into said clutch carrier generally at said spline means coupling said friction plates and said gear means, said lubricant supplying means comprising a pressurized lubricant supply conduit defined by said shaft, and at least one lubricant passage defined by said gear means and in fluid communication with said supply conduit for supplying lubricant into said clutch carrier at said spline means; and means for inhibiting flow of lubricant out of said clutch carrier to enhance the service life of said spline means, said means for inhibiting lubricant flow comprising annular seal means arranged concentrically about said shaft and extending between and being in sealing engagement with said gear means and said clutch carrier so that flow of lubricant axially out of said clutch carrier between said gear means and said clutch carrier is substantially prevented, said means for inhibiting lubricant flow further comprising means for restricting lubricant flow radially of said clutch carrier including friction surface means of said friction plates, wherein said friction surface means defines a plurality of grooves arranged to inhibit and substantially prevent flow of lubricant radially of said clutch carrier through said grooves.

2. A clutch assembly and lubrication arrangement in accordance with claim 1, wherein said plurality of grooves of said friction surface means are arranged in non-radial, non-intersecting parallel groups, wherein each said groove is arranged generally as a chord with respect to the annular friction plate, said grooves being arranged not to intersect an interior edge of the annular friction plate.

* * * * *